(12) United States Patent
Höfler et al.

(10) Patent No.: US 10,077,053 B2
(45) Date of Patent: Sep. 18, 2018

(54) METHOD FOR OPERATING A DRIVE TRAIN

(71) Applicant: ZF Friedrichshafen AG, Friedrichshafen (DE)

(72) Inventors: Hans Höfler, Immenstaad am Bodensee (DE); Thomas Kurz, Langenargen (DE); Andreas Schwarz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 9 days.

(21) Appl. No.: 15/407,374

(22) Filed: Jan. 17, 2017

(65) Prior Publication Data

US 2017/0210387 A1   Jul. 27, 2017

(30) Foreign Application Priority Data

Jan. 21, 2016 (DE) .......................... 10 2016 200 849

(51) Int. Cl.

| | |
|---|---|
| *B60W 10/02* | (2006.01) |
| *B60W 30/19* | (2012.01) |
| *B60W 10/06* | (2006.01) |
| *F16D 48/06* | (2006.01) |
| *F16H 45/02* | (2006.01) |
| *F16H 61/14* | (2006.01) |

(52) U.S. Cl.
CPC .......... *B60W 30/19* (2013.01); *B60W 10/026* (2013.01); *B60W 10/06* (2013.01); *F16D 48/06* (2013.01); *F16H 45/02* (2013.01); *F16H 61/143* (2013.01); *B60W 2550/00* (2013.01); *B60W 2710/024* (2013.01); *B60W 2710/0644* (2013.01); *B60W 2710/0666* (2013.01)

(58) Field of Classification Search
None
See application file for complete search history.

(56) References Cited

U.S. PATENT DOCUMENTS

| | | | | |
|---|---|---|---|---|
| 5,086,889 | A * | 2/1992 | Nobumoto | ............ F16H 61/143 192/3.31 |
| 5,389,051 | A | 2/1995 | Hirate et al. | |
| 5,413,540 | A | 5/1995 | Streib et al. | |
| 8,152,690 | B2 | 4/2012 | Hatanaka | |
| 8,517,894 | B2 | 8/2013 | Hofler et al. | |
| 2014/0046529 | A1* | 2/2014 | Gibson | .................... F02N 11/00 701/22 |
| 2015/0032349 | A1* | 1/2015 | Sato | ....................... F16H 61/143 701/68 |
| 2015/0134215 | A1* | 5/2015 | Kawaguchi | ........... F16H 61/143 701/67 |
| 2015/0239467 | A1* | 8/2015 | Wang | ....................... B60K 6/48 477/5 |
| 2016/0059846 | A1* | 3/2016 | Wang | .................... B60W 20/40 477/5 |
| 2016/0377128 | A1* | 12/2016 | Lee | ......................... F16D 48/06 701/67 |
| 2017/0174220 | A1* | 6/2017 | Puri | ..................... B60W 30/19 |

FOREIGN PATENT DOCUMENTS

| | | |
|---|---|---|
| CH | 706 519 A1 | 11/2013 |
| DE | 12 23 967 A1 | 1/1994 |
| DE | 692 31 397 T2 | 2/2001 |
| DE | 11 2006 002 746 T5 | 8/2008 |
| DE | 10 2008 043 105 A1 | 4/2010 |

OTHER PUBLICATIONS

German Search Report Corresponding to 10 2013 200 849.8 dated Nov. 7, 2016.

\* cited by examiner

*Primary Examiner* — Justin Holmes
(74) *Attorney, Agent, or Firm* — Davis & Bujold PLLC; Michael J. Bujold

(57) ABSTRACT

A rotational speed-regulated internal combustion engine in a working machine, for example a wheel loader, shortly before the engaging a bridging clutch of a hydrodynamic torque converter, is switched over in such manner that the internal combustion engine operates under torque regulation when the bridging clutch of the hydrodynamic torque converter is engaged.

7 Claims, No Drawings

METHOD FOR OPERATING A DRIVE TRAIN

This application claims priority from German patent application serial no. 10 2016 200 849.8 filed Jan. 21, 2016.

FIELD OF THE INVENTION

The invention relates to a method for operating a drive-train.

BACKGROUND OF THE INVENTION

CH706519A1 discloses a method for operating a drive-train of a working machine, in which the drive motor is an internal combustion engine and the internal combustion engine is controlled by means of a rotational speed regulating system. This ensures that the rotational speed of the drive unit can be kept almost constant regardless of the load, for example in order to operate a hydraulic pump in a uniform manner.

Whereas rotational speed regulation is found to be advantageous for auxiliary power takeoffs in working machines, for example for operating the pump of the working hydraulic system, rotational speed regulation has a negative influence on the driving behavior of the vehicle, particularly when shifting gears or shifting a converter bridging clutch of a hydrodynamic torque converter, since the vehicle undergoes an acceleration during the shifting process.

DETAILED DESCRIPTION OF THE PREFERRED EMBODIMENTS

The purpose of the present invention is to provide a method for operating a drive-train, which is suitable for a working machine and offers good driving comfort at the same time as the best possible working performance.

This objective is achieved by a method of the type concerned which also embodies the characteristics specified in the principal claim.

The invention is based on the recognition that the driving behavior of the vehicle, particularly when closing the bridging clutch of the hydrodynamic torque converter or when changing gears with a closed bridging clutch, is improved when the drive motor is operated under torque regulation, especially in the part-load range.

According to the invention, a control unit controls the drive motor, for example an internal combustion engine in the form of a Diesel engine, in such manner that depending on the driving situation of the drive-train or the vehicle the drive-train works under rotational speed regulation or under torque regulation.

Preferably, the drive motor is controlled in such manner that it works under torque regulation when the bridging clutch of the hydrodynamic torque converter should be actuated in the closing direction, or is being actuated in the closing direction, or when a gearshift should be or is being carried out, particularly when the bridging clutch is closed and in particular in the part-load range.

This makes it possible to operate working machines, such as wheel loaders, fork-lifts or special vehicles which have a hydrodynamic torque converter with a bridging clutch, in such manner that in the working range in which as a rule the bridging clutch of the hydrodynamic torque converter is actuated in the opening direction, the drive motor is operated under rotational speed regulation, whereby the pump of the working device can be operated in a uniform manner, and outside the working range, during so-termed driving operation, the drive motor is under torque regulation, whereby shifts of the bridging clutch of the hydrodynamic torque converter or gearshifts take place more comfortably.

Preferably, the changeover from rotational speed regulation to torque regulation is triggered by a signal from the transmission's electronic system. Depending on a driving situation detected by the transmission's electronic system, the transmission's electronic system carries out the changeover. As a rule the bridging clutch of the hydrodynamic torque converter is also controlled and closed by the transmission's electronic system. The point in time when the bridging clutch is closed depends on the turbine rotational speed of the hydrodynamic torque converter at a rotational speed level at which the same amount of torque is applied at the transmission input when the bridging clutch is closed, as when the bridging clutch is open. Thus, by way of the turbine rotational speed signal it becomes possible, shortly before the closing point of the bridging clutch, to change over from rotational speed regulation of the drive motor to torque regulation thereof. Consequently, the closing process of the bridging clutch and also all gearshifts while the bridging clutch is closed take place with the drive motor under torque regulation. The changeover from torque regulation of the drive motor to rotational speed regulation of the drive motor takes place at the same point in time, when the transmission's electronic system emits the signal to the bridging clutch to actuate the bridging clutch in the opening direction.

In another version of the invention, a changeover from rotational speed regulation of the drive motor to torque regulation thereof is prevented at low speeds, i.e. at low drive output rotational speeds of the transmission, so that at these low speeds the vehicle always drives under rotational speed regulation in order to be able, when the hydraulic pump of the working hydraulic system is operating, to operate uniformly with a rotational speed-regulated drive motor.

The invention claimed is:

1. A method of operating a drive-train that has a drive motor, a hydrodynamic torque converter and a bridging clutch that bridges the hydrodynamic torque converter, whereby when the bridging clutch is actuated in an engaging direction, the drive motor being functionally connected to the input shaft of a transmission such that when the drive-train is operating:
   below a predefined rotational speed of the drive motor, controlling the drive motor, with a control unit, in such manner that the drive motor operates under rotational speed regulation, and
   controlling the drive motor, with the control unit, in such manner that the drive motor operates under torque regulation.

2. The method according to claim 1, further comprising, when the bridging clutch is actuated in the engaging direction, controlling the drive motor, with the control unit, in such manner that the drive motor operates under torque regulation.

3. The method according to claim 2, further comprising, shortly before engagement of the bridging clutch, controlling the drive motor, with the control unit, in such manner that the drive motor operates under torque regulation.

4. The method according to claim 1, further comprising when the bridging clutch is actuated in a disengaging direction, controlling the drive motor, with the control unit, in such manner that the motor operates under rotational speed regulation.

5. The method according to claim 1, further comprising using the method in a working machine.

6. A method of operating a drive-train of a working machine, the drive train having a drive motor, a hydrodynamic torque converter having a bridging clutch and a transmission having an input shaft, the drive motor being functionally connectable to the input shaft of the transmission, with the hydrodynamic torque converter, when the bridging clutch is actuated in an engaging direction, the method comprising:

- regulating a rotational speed of the drive motor, with a control unit, when the bridging clutch is actuated in a disengaging direction;
- regulating torque of the drive motor, with the control unit, when the bridging clutch is engaged; and
- switching, with the control unit, from regulating the rotational speed of the drive motor to regulating the torque of the drive motor before the bridging clutch is engaged.

7. A method of operating a drive-train of a working machine, the drive train having a drive motor, a hydrodynamic torque converter having a bridging clutch and a transmission having an input shaft, the drive motor being functionally connectable to the input shaft of the transmission, with the hydrodynamic torque converter, when the bridging clutch is actuated in an engaging direction, the method comprising:

- regulating a rotational speed of the drive motor, with a control unit, when the rotational speed of the drive motor is below a predefined rotational speed value;
- regulating the rotational speed of the drive motor, with the control unit, when the bridging clutch is actuated in a disengaging direction;
- regulating torque of the drive motor, with the control unit, when the bridging clutch is engaged; and
- switching, with the control unit, from regulating the rotational speed of the drive motor to regulating the torque of the drive motor before the bridging clutch is engaged.

* * * * *